(12) United States Patent
Le (10) Patent No.: US 10,058,217 B2
(45) Date of Patent: Aug. 28, 2018

(54) METHOD FOR CONTROLLING MIXER, CONTROLLER AND MIXER

(71) Applicant: FOSHAN CITY SHUNDE JUTIAN ELECTRIC APPLIANCE CO., LTD., Foshan, Guangdong (CN)

(72) Inventor: Meiyi Le, Guangdong (CN)

(73) Assignee: FOSHAN CITY SHUNDE JUTIAN ELECTRIC APPLIANCE CO., LTD., Foshan (CN)

(*) Notice: Subject to any disclaimer, the term of this patent is extended or adjusted under 35 U.S.C. 154(b) by 155 days.

(21) Appl. No.: 14/977,613

(22) Filed: Dec. 21, 2015

(65) Prior Publication Data

US 2016/0256010 A1 Sep. 8, 2016

(30) Foreign Application Priority Data

Mar. 5, 2015 (CN) .......................... 2015 1 0097885
Mar. 5, 2015 (CN) ..................... 2015 2 0127769 U
Jul. 2, 2015 (CN) ..................... 2015 2 0476513 U
Dec. 11, 2015 (CN) .......................... 2015 1 0916053

(51) Int. Cl.
   A47J 43/00 (2006.01)
   A47J 43/08 (2006.01)
   A47J 43/07 (2006.01)
   A47J 43/046 (2006.01)

(52) U.S. Cl.
   CPC ........... *A47J 43/085* (2013.01); *A47J 43/046* (2013.01); *A47J 43/0716* (2013.01)

(58) Field of Classification Search
   CPC ....... A47J 43/085; A47J 43/09; A47J 43/0716
   See application file for complete search history.

(56) References Cited

U.S. PATENT DOCUMENTS 6,364,522 B2 * 4/2002 Kolar .................... A47J 27/62
                                                          241/36
7,942,570 B2 * 5/2011 Steiner ............... A47J 43/0716
                                                          366/197

* cited by examiner

*Primary Examiner* — Anshu Bhatia (57) ABSTRACT

The present invention discloses a method for controlling a mixer, including sending a fan initiation control signal to the fan when obtaining a instruction for initiating the mix from the user, to allow the fan to operate at a pre-set fan rotation speed; sending a motor initiation control signal to the motor to allow the motor to operate at a pre-set motor rotation speed within a set mixing time period; wherein the instruction for initiating the mix includes the mixing time period; sending a motor stop control signal to the motor when the mixing time period is ended to stop the operation of the motor; and sending a fan stop control signal to the fan after a pre-set first delayed time period to stop the operation of the fan. Meanwhile the present invention also provides a controller for a mixer and a mixer.

6 Claims, 9 Drawing Sheets

METHOD FOR CONTROLLING MIXER, CONTROLLER AND MIXER

CROSS-REFERENCE TO PRIOR APPLICATION

This application claims the benefit of Chinese Patent Application No. 201510097885.6, filed on Mar. 5, 2015, Chinese Patent Application No. 201520127769.X, filed on Mar. 5, 2015, Chinese Patent Application No. 201520476513.X, filed on Jul. 2, 2015, and Chinese Patent Application No. 201510916053.2, filed on Dec. 11, 2015, which are incorporated herein by reference.

FIELD OF THE INVENTION

The present invention relates to the field of living electrical devices, and particularly, to a method for controlling a mixer, a controller and a mixer.

BACKGROUND OF THE INVENTION

In our lives, mixers such as soymilk makers, coffee machines, sand ice makers and the like, which are commonly used as home electrical appliances, are extensively used to mix and smash various food, so as to make increasing delicious food in various styles.

The motors in the existing mixers release high level of heat when the mixers are working, due to high rotation speed of the motors. Therefore, fans are mounted on the end of the rotation axes of the motors to release the heat out of the motors, thereby avoiding the damage of the motors due to overheat and allowing the motors to stably and normally operate.

However, such heat dissipation structure has the following shortcomings:

1. The operation of the fan and the motor will be stopped at the same time, while the internal temperature of the motor is still very high at this time. Thus, the internal coils of the motor will be easily damaged, and the service life of the motor will be reduced.

2. The fan is synchronously rotated with the motor at the same speed as the motor. When the motor is rotated at high speed, the vibration and the high level of noise up to 85 to 100 db will be generated in the fan, and thus the fan will be worn down in an expedited way, thereby producing an influence on the service life of the fan and reducing the performance of the product.

SUMMARY OF THE INVENTION

The present invention provides a method for controlling a mixer, a controller and a mixer, which can solve the problem of reduced service life of the motor caused by the fact that the operation of the fan and the motor in the existing mixer is synchronously stopped and thus the heat dissipation is insufficient.

In one aspect, the present invention provides a method for controlling a mixer that comprises a housing, a cup body disposed on the housing, a fan and a motor disposed within the housing, and a mixing part disposed within the cup body and co-axially connected to the motor, wherein the fan and the motor are opposite to each other and the method includes:

sending a fan initiation control signal to the fan when obtaining an instruction for initiating the mix from the user, to allow the fan to operate at a pre-set fan rotation speed;

sending a motor initiation control signal to the motor, to allow the motor to operate at a pre-set motor rotation speed within a pre-set mixing time period;

sending a motor stop control signal to the motor when the mixing time period is ended, to stop the operation of the motor;

sending a fan stop control signal to the fan after a pre-set first delayed time period, to stop the operation of the fan.

More preferably, the said sending a motor initiation control signal to the motor allows the motor to operate at the pre-set motor rotation speed within the pre-set mixing time period comprises: sending the motor initiation control signal to the motor when obtaining the instruction for initiating the mix from the user and after a pre-set second delayed time period, to allow the motor to operate at the pre-set motor rotation speed within the pre-set mixing time period.

In one embodiment of the controlling method, the said allowing the motor to operate at the pre-set motor rotation speed within a pre-set mixing time period specifically relates to allowing the motor to uniformly operate at a first motor rotation speed within the pre-set mixing time period; and the instruction for initiating the mix includes a first motor rotation speed.

More preferably, the method for controlling a mixer also includes:

sending a rotation speed switching control signal to the motor when obtaining an instruction for switching the rotation speed from the user within the mixing time period, to allow the motor to uniformly operate at a second motor rotation speed; wherein the instruction for switching the rotation speed includes the second motor rotation speed.

In one embodiment of the controlling method, the mixing time period includes N consecutive time periods, each of which has a pre-set motor rotation speed. The motor rotation speed pre-set within at least one time period is different from the motor rotation speed set within other time periods.

More preferably, the instruction for initiating the mix includes selection of one mixing work mode from M kinds of the pre-set mixing work modes by the user. Each mixing work mode is individually provided with the motor rotation speed of each time period in N consecutive time periods.

More preferably, the method for controlling a mixer also includes:

extending the mixing time period to the originally set mixing time period when obtaining an instruction for extending the mix from the user within the mixing time period, to update the mixing time period; wherein the instruction for extending the mix includes the time period which needs to be extended;

obtaining the current motor rotation speed when originally set mixing time period is ended and sending a rotation speed maintenance signal to the motor, to allow the motor to uniformly operate at a current motor rotation speed within the time period which needs to be extended.

In another aspect, the present invention also provides a controller for a mixer, wherein the mixer includes a housing, a cup body disposed on the housing, a motor and a fan disposed within the housing, and a mixing part disposed within the cup body and co-axially connected to the motor; and wherein the fan and the motor are opposite to each other and the controller includes:

a first operation control unit, for sending a fan initiation control signal to the fan when obtaining an instruction for initiating the mix from the user, to allow the fan to operate at a pre-set fan rotation speed;

a second operation control unit, for sending a motor initiation control signal to the motor, to allow the motor to operate at a pre-set motor rotation speed within a pre-set mixing time period;

a first stop control unit, for sending a motor stop control signal to the motor when the mixing time period is ended, to stop the operation of the motor;

a second stop control unit, for sending a fan stop control signal to the fan after a pre-set first delayed time period, to stop the operation of the fan.

More preferably, the second operation control unit is specifically used to send the motor initiation control signal to the motor when obtaining the instruction for initiating the mix from the user and after a pre-set second delayed time period, to allow the motor to operate at the pre-set motor rotation speed within the pre-set mixing time period.

In one embodiment of the controlling method, the said allowing the motor to operate at the pre-set motor rotation speed within the pre-set mixing time period specifically relates to allowing the motor to uniformly operate at the first motor rotation speed within the set mixing time period; wherein the instruction for initiating the mix includes the first motor rotation speed.

More preferably, the controller for a mixer also includes:

a motor rotation speed switching unit, for sending a rotation speed switching control signal to the motor when obtaining an instruction for switching the rotation speed from the user within the mixing time period, to allow the motor to uniformly operate at the second motor rotation speed, wherein the instruction for switching the rotation speed includes the second motor rotation speed.

In another embodiment of the controller, the mixing time period includes N consecutive time periods, each of which has a pre-set motor rotation speed; wherein the motor rotation speed pre-set within at least one time period is different from the motor rotation speed set within other time periods.

More preferably, the instruction for initiating the mix includes selection of one mixing work mode from M kinds of pre-set mixing work modes by the user; wherein each mixing work mode is individually provided with the motor rotation speed of each time period from N consecutive time periods.

More preferably, the controller for a mixer also includes:

a mixing time updating unit, for extending the time period to the originally set mixing time period when obtaining an instruction for extending the mix from the user within the mixing time period, to update the mixing time period; wherein the instruction for extending the mix includes the time period which needs to be extended;

wherein a current motor rotation speed is obtained when the originally set mixing time period is ended and a rotation speed maintenance signal is sent to the motor to allow the motor to uniformly operate at the current motor rotation speed within the time period which needs to be extended.

Meanwhile, the present invention provides a mixer that includes a housing, a cup body disposed on the housing, a motor and a fan disposed within the housing, and a mixing part disposed within the cup body and co-axially connected to the motor, wherein the fan and the motor are opposite to each other, and the mixer also includes said controller for the mixer.

More preferably, the mixer also includes an input filtration module, a motor driving module, a power module and a display module.

A commercial power input port of the input filtration module is electrically connected to the commercial power, and the output port of the input filtration module is electrically connected to the power module.

The power module is electrically connected to the power ports of the motor, the motor driving module, the display module and the controller, respectively.

A fan controlling port of the controller is electrically connected to the power module and the controller controls the ON/OFF of the power port of the fan by controlling the power module.

A motor controlling port of the controller is electrically connected to the motor through the motor driving module and controls the rotation speed of the motor by the motor driving module.

A display signal output port of the controller is electrically connected to the display module.

More preferably, the mixer also includes a sensor for detecting the motor rotation speed of the motor, wherein the sensor is electrically connected to the controller.

More preferably, a step is provided on the inner wall at the upper opening of the cup body. The mixer also includes an upper auxiliary cutting apparatus disposed on the step and rotating relative to the cup body.

More preferably, the upper auxiliary cutting apparatus includes a base substrate with a central hole, a driving apparatus and at least two upper mixing blades disposed on the driving apparatus, wherein the base substrate is disposed on the step and removably connected to the cup body, and the driving apparatus is pin-jointed to the base substrate.

More preferably, the driving apparatus includes a base plate, a driving handle and an axle disposed between the driving handle and the base plate, wherein the upper mixing blades is fixably connected to the base plate, and an axle sleeve is disposed on the central hole of the base substrate, in which a circle guide plate is disposed. The mixer also includes a sleeve, on the top of which a circle pressure plate is disposed, wherein the driving handle passes through the axle sleeve on the base substrate and goes out of the axle sleeve; and the base plate is able to slide fit with a circle guide plate in the axle sleeve; the sleeve is inserted into the central hole of the circle guide plate, the bottom end of the sleeve is attached to the base plate, the circle pressure plate is embedded into the sleeve and is able to slide fit with the circle guide plate; the sleeve is fixably connected to the base plate.

The present invention achieves the following advantages:

1. The operation of the fan is stopped later than the motor, so as to release the residual heat out of the motor, thereby avoiding the damage of the internal coils within the motor due to the residual heat and enhancing the service life of the motor.

2. The vibration and the noise caused by the synchronous rotation of the fan and the motor and the issues causing that the fan is worn down in an expedited way and that the service life of the fan is influenced are avoided. The fan of the present invention produces a noise ranging from 65 to 85 db when it is working, as compared to the noise up to 85 to 100 db produced by the conventional controlling structure in which the fan and the motor synchronously operate. The fan of the present invention has the features of low working noise and long service life.

DETAILED DESCRIPTION OF THE INVENTION

The technical solution in the working examples of the present invention will be clearly and completely described as below, by referring the drawings of the present invention. It should be understood that the working examples described below are only a part of the working examples of the present invention, rather than all of the working examples. Other working examples obviously obtained by the ordinary skilled in the art come within the protection scope of the present invention.

Figure 1:
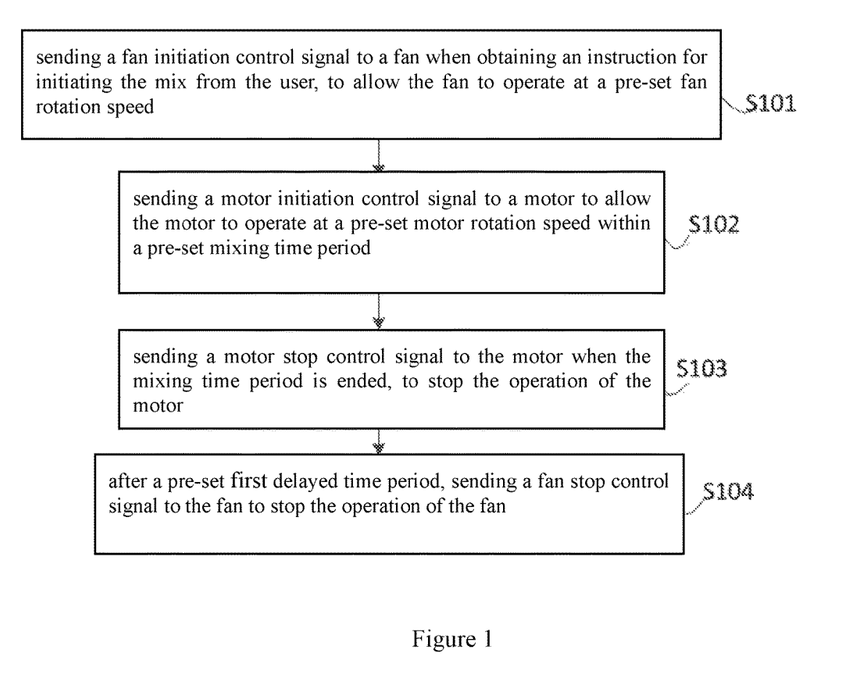
FIG. 1 is a schematic flow diagram of the first working example of the method for controlling the mixer of the present invention.

Referring to FIG. 1, a schematic flow diagram of the first working example of the method for controlling the mixer of the present invention is provided, wherein the mixer includes a housing, a cup body disposed on the housing, a motor and a fan disposed within the housing, and a mixing part disposed within the cup body and co-axially connected to the motor, and wherein the fan and the motor are opposite to each other, the method for controlling the mixer includes:

S101, sending a fan initiation control signal to the fan when obtaining an instruction for initiating the mix from the user, to allow the fan to operate at the pre-set fan rotation speed;

S102, sending a motor initiation control signal to the motor, to allow the motor to operate at the pre-set motor rotation speed within the pre-set mixing time period;

S103, sending a motor stop control signal to the motor when the mixing time period is ended, to stop the operation of the motor;

S104, sending a fan stop control signal to the fan after the pre-set first delayed time period, to stop the operation of the fan.

In this working example, the method for controlling the mixer individually controls the motor and the fan by two-way individual output controlling means, respectively. The operation of the fan is stopped later than the motor, so as to release the residual heat out of the motor and thus avoid the damage of the internal coils within the motor due to the residual heat and enhance the service life of the motor. Meanwhile, the vibration and the noise caused by the synchronous rotation of the motor and the fan and the issues causing that the fan is worn down in an expedited way and that the service life of the fan is influenced are avoided.

More preferably, the said sending the motor initiation control signal to the motor allows the fan to operate at the pre-set motor rotation speed within the pre-set mixing time period. Particularly, the motor initiation control signal is sent to the motor when obtaining the instruction for initiating the mix from the user and after the pre-set second delayed time period, so as to allow the motor to operate at the pre-set motor rotation speed within the pre-set mixing time period. That is to say, the fan is initiated prior to the motor, so that the internal air convection is produced in advance and the effect of heat dissipation is improved, thereby solving the problem of insufficient heat dissipation caused by the conventional synchronous initiation of the fan and the motor.

The present invention also provides a second working example of the method for controlling the mixer. The method includes steps S1-S4 of the first working example of the method for controlling the mixer as mentioned above and the method further defines that the said allowing the motor to operate at the pre-set motor rotation speed within the pre-set mixing time period specifically relates to allowing the motor to uniformly operate at the first motor rotation speed within the set mixing time period, wherein the instruction for initiating the mix includes the first motor rotation speed.

More preferably, in this working example, the method for controlling the mixer also includes: sending a rotation speed switching control signal to the motor when obtaining an instruction for switching the rotation speed from the user within the mixing time period, to allow the motor to uniformly operate at the second motor rotation speed, wherein the instruction for switching the rotation speed includes the second motor rotation speed.

That is to say, the user can select the first motor rotation speed to allow the motor to operate at the first motor rotation speed, which can be switched to the second rotation speed to allow the motor to operate at the second motor rotation speed. It should be noted that the user can select a number of rotation speeds and the rotation speeds can be repeatedly switched among them within the mixing time period. For example, the rotation speed of the motor is V1 initially and then the rotation speed of the motor can be switched to V2 according to the user's requirement, thereafter, the rotation speed of the motor can be switched to V3 by the user.

The present invention also provides a third working example of the method for controlling the mixer. The method for controlling the mixer includes steps S1~S4 in the first working example of the method for controlling the mixer as mentioned above, and the method also defines that the mixing time period includes N consecutive time periods, each of which has a pre-set motor rotation speed; and that the motor rotation speed set within at least one time period is different from the motor rotation speed within other time periods. Therefore, within the mixing time period, the rotation speed of the motor is not constant, but variable. For example, the mixing speed can be initially set at high level, and finally the mixing speed can be set at low level, so that the effect of the mix can be improved and the waste of the electrical energy can be reduced since a certain rotation speed doesn't keep constant. The motor rotation speed within each time period is pre-set and the optimal solution can be obtained according to the experience or the experimental results.

More preferably, the instruction for initiating the mix includes selection of one mixing work mode from M kinds of pre-set mixing work modes by user. Each mixing work mode is individually provided with motor rotation speed of each time period from N consecutive time periods. For example, the mixing work mode I is making ice sand, the mixing work mode II is making soymilk, and the mixing work mode III is making juice, and the like. The motor rotation speeds of N consecutive time periods are pre-set in each mixing work mode.

The present invention also provides the fourth working example of the method for controlling the mixer. The method for controlling the mixer includes steps S1~S4 of the first working example of the method for controlling the mixer as mentioned above, and the method also includes:

extending a time period to the originally set mixing time period when obtaining the instruction for extending the mix from the user within the mixing time period, to update the mixing time period, wherein the instruction for extending the mix includes the time period which needs to be extended;

obtaining a current motor rotation speed when the originally set mixing time period is ended, and sending a rotation speed maintenance signal to the motor, to allow the motor to uniformly operate at the current motor rotation speed within the time period which needs to be extended.

For example, the mixing time period is initially set as 3 minutes, if the user notes that the mix is insufficient within these 3 minutes, then the mixing time period is increased by 1 minute by inputting the instructions for extending the mix, and thus the motor will keep operation for 1 minute at the rotation speed when the 3 minutes time period is ended.

Figure 2:
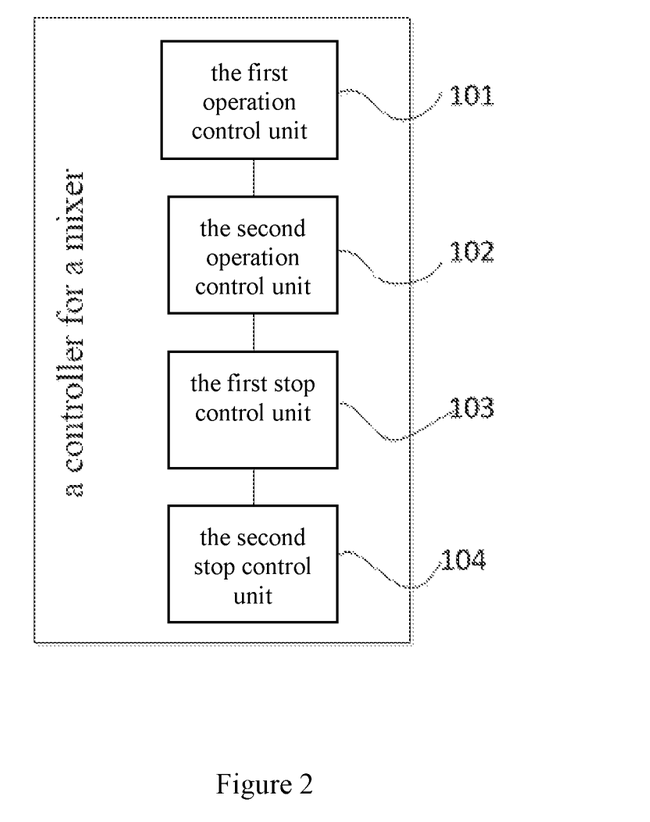
FIG. 2 is a schematic structure diagram of the first working example of the controller of the mixer of the present invention.

The present invention also provides the first working example of the controller for a mixer. The mixer includes a housing, a cup body disposed on the housing, a motor and a fan disposed within the housing, and the mixing part disposed within the cup body and co-axially connected to the motor, wherein the fan and the motor are opposite to each other. Referring to FIG. 2, a schematic structure diagram of the first working example of the controller of the mixer of the present invention is provided. The controller includes:

a first operation control unit 101, for sending a fan initiation control signal to the fan when obtaining an instruction for initiating the mix from the user, to allow the fan to operate at the pre-set fan rotation speed;

a second operation control unit 102, for sending a motor initiation control signal to the motor, to allow the motor to operate at the pre-set motor rotation speed within the pre-set mixing time period;

a first stop control unit 103, for sending a motor stop control signal to the motor when the mixing time period is ended, to stop the operation of the motor;

a second stop control unit 104, for sending a fan stop control signal to the fan after the pre-set first delayed time period, to stop the operation of the fan.

In this working example, the controller for a mixer individually controls the motor and the fan respectively by two-way individual output controlling means. The operation of the fan is stopped later than the motor, so as to release the residual heat out of the motor, thereby avoiding the damage of the internal coils of the motor due to the residual heat and enhancing the service life of the motor. Meanwhile, the vibration and noise caused by the synchronous rotation of the motor and the fan and the issues causing that the fan is worn out in an expedited way and the service life of the fan is influenced are avoided.

More preferably, the second operation control unit 102 is specifically used to send a motor initiation control signal to the motor when obtaining the instruction for initiating the mix from the user, and after the pre-set second delayed time period, so as to allow the motor to operate at the pre-set motor rotation speed within the pre-set mixing time period. That is to say, the operation of the fan is initiated prior to the motor, and the internal air convection is produced in advance, and thus the effect of the heat dissipation is improved and the problem of insufficient heat dissipation caused by the conventional synchronous initiation of the fan and the motor are addressed.

The present invention also provides the second working example of the controller for a mixer, which includes the first operation control unit 101, the second operation control unit 102, the first stop control unit 103 and the second stop control unit 104 of the first working example of the controller for a mixer as mentioned above, and the controller also defines that the said allowing the motor to operate at the pre-set motor rotation speed within the pre-set mixing time period specifically relates to allowing the motor uniformly operate at the first motor rotation speed within the set mixing time period and the instruction for initiating the mix includes the first motor rotation speed.

More preferably, the controller for a mixer also includes:

a motor rotation speed switching unit, for sending a rotation speed switching control signal to the motor when obtaining the instruction for switching the rotation speed from the user within the mixing time period, so as to allow the motor to uniformly operate at the second motor rotation speed; wherein the instruction for switching the rotation speed includes the second motor rotation speed.

That is to say, the user can select the first motor rotation speed to allow the motor to operate at the first motor rotation speed, and the first motor rotation speed can be switched to the second rotation speed to allow the motor to operate at the second motor rotation speed. It should be noted that, the user can select a number of rotation speeds, and the rotation speeds can be repeatedly switched to the different rotation speeds within the mixing time period. For example, the rotation speed of the motor can be initially set at V1, and then the rotation speed can be switched to V2 according to the user's requirement, thereafter, the rotation speed can be switched to V3 by the user.

The present invention also provides the third example of the controller for a mixer, which includes the first operation control unit 101, the second operation control unit 102, the first stop control unit 103 and the second stop control unit 104 of the first working example of the controller for a mixer as mentioned above, and the controller further defines that the mixing time period includes N consecutive time periods, each of which has a pre-set motor rotation speed; the motor rotation speed pre-set within at least one time period is different from the motor rotation speed set within other time periods. Therefore, in the mixing time period, the rotation speed of the motor doesn't keep constant, but variable. For example, the mixing speed can be initially set at high level, and the mixing speed can be finally set at low level, so that the effect of mixing can be improved and the waste of the electrical energy can be reduced since a certain rotation speed doesn't keep constant. The motor rotation speed within each time period is pre-set and the optimal solution can be obtained according to the experience and experimental results.

More preferably, the instruction for initiating the mix includes selection of one mixing work mode from M kinds of the pre-set mixing work modes by user and each mixing work mode is individually provided with the motor rotation speed of each time period from N consecutive time periods. For example, the mixing work mode I is making ice sand, the mixing work mode II is making soymilk, and the mixing work mode III is making juice, and the like. Each mixing work mode is pre-set with motor rotation speed within N consecutive time periods.

The present invention also provides the fourth working example of the controller for a mixer, which includes the first operation control unit 101, the second operation control unit 102, the first stop control unit 103 and the second stop control unit 104 of the first working example of the controller of the mixer as mentioned above, and the controller also includes:

a mixing time updating unit, for extending the mixing time period to the originally set mixing time period when obtaining the instruction for extending the mix from the user within the mixing time period, so as to update the mixing time period, wherein the instruction for extending the mix includes the extended mixing time period;

wherein when the originally set mixing time period is ended, a current motor rotation speed is obtained and a rotation speed maintenance signal is sent to the motor to allow the motor to uniformly operate at the current motor rotation speed within the mixing time period which needs to be extended.

For example, the mixing time period is initially set as 3 minutes, if the user notes that the mix is insufficient within these 3 minutes, then the mixing time period can be increased by 1 minute by inputting the instruction for extending the mix, therefore, the motor will keep operation for 1 minute at the rotation speed when the mixing time period of 3 minutes is ended.

Figure 3:
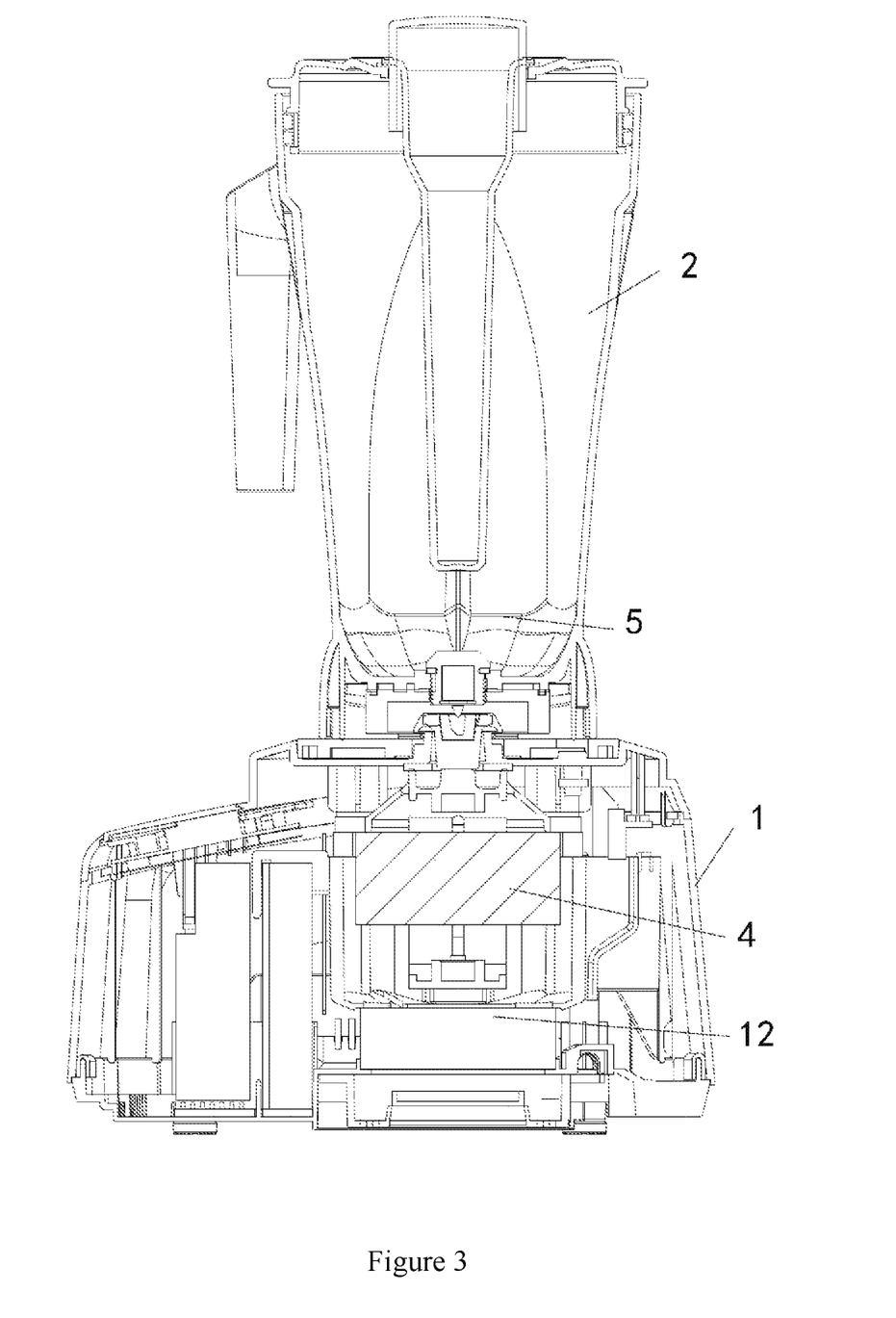
FIG. 3 is a schematic structure diagram of a mixer provided by the working example of the present invention.

Meanwhile, the working example of the present invention also provides a mixer. As shown in FIG. 3, a schematic structure diagram of a mixer provided by the working example of the present invention is provided.

The mixer includes a housing 1, a cup body 2 disposed on the housing 1, a motor 12 and a fan 4 disposed within the housing 1, and a mixing part 5 disposed within the cup body 2 and co-axially connected to the motor 12, wherein the fan 4 and the motor 12 are opposite to each other. The mixer also includes the controller for the mixer as mentioned above. In this example, the mixing part 5 is a cutting blade.

The working mechanism of the mixer is that the controller respectively controls the rotation of the motor 12 and the fan 4, the motor 12 drives the rotation of the mixing part 5 to mix the substances in cup body 2; the fan 4 is used to dissipate the heat from the motor 12.

Figure 4:
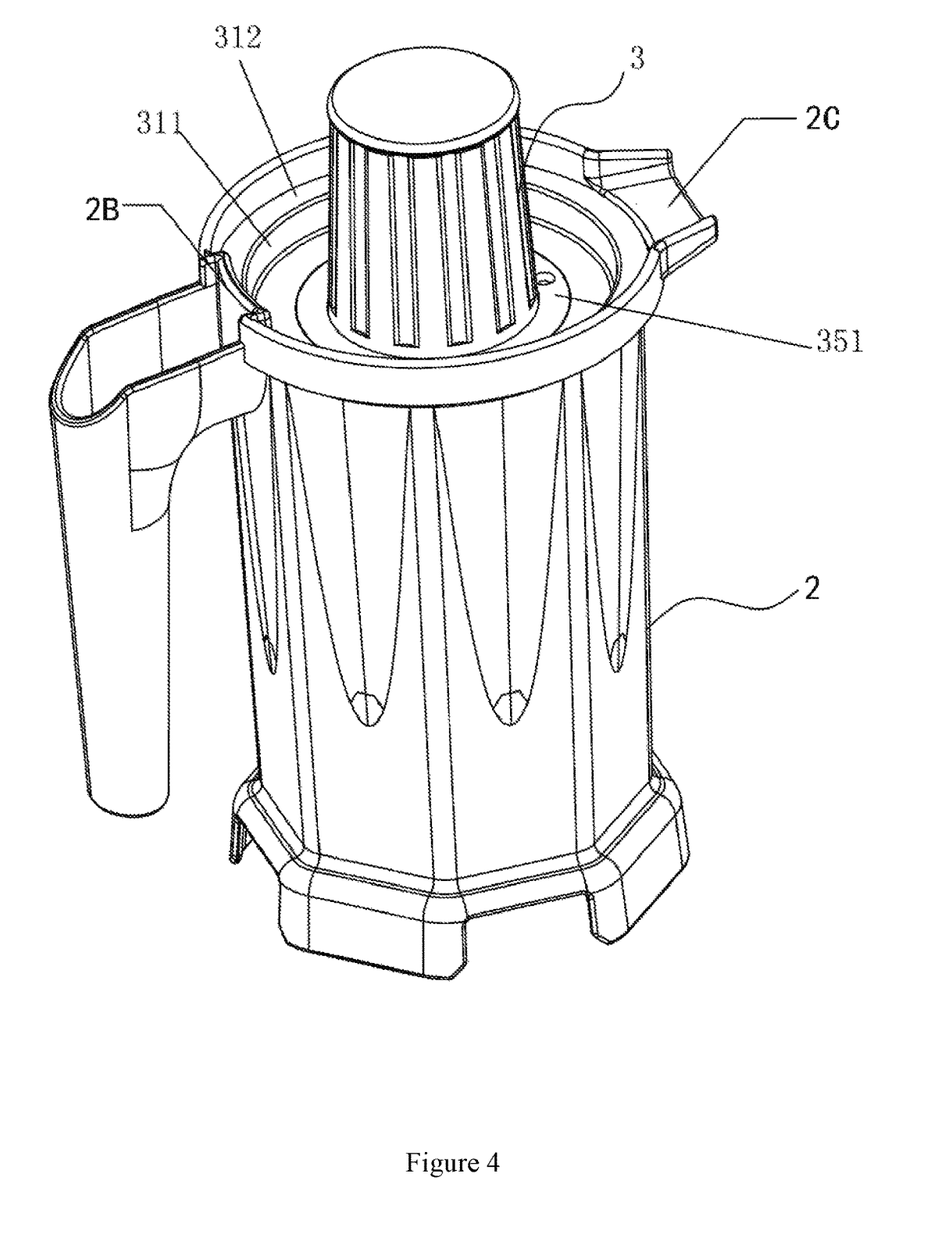
FIG. 4 is a perspective view of the cup body of the mixer as shown in FIG. 3.
Figure 5:
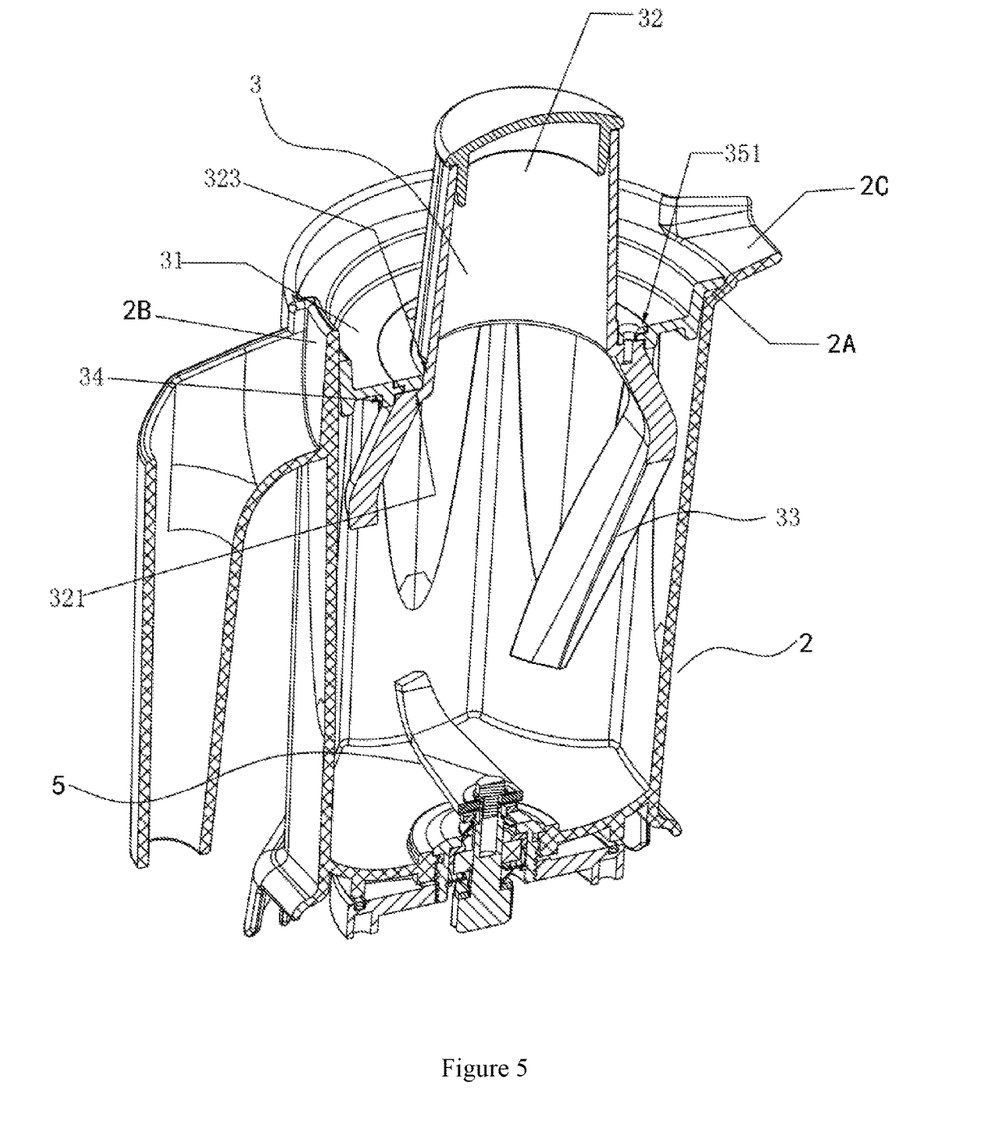
FIG. 5 is a perspective sectional view of the cup body as shown in FIG. 4.
Figure 6:
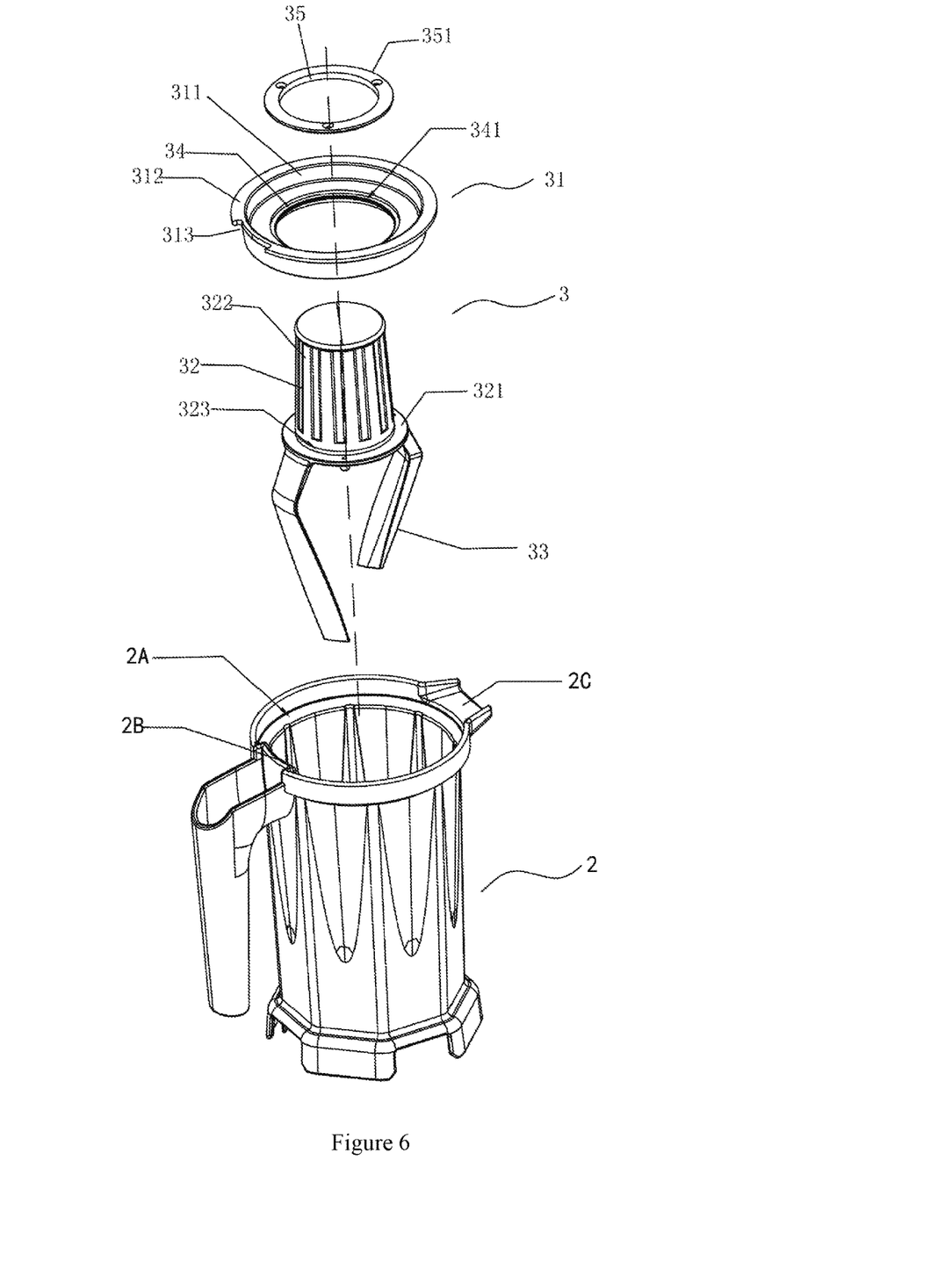
FIG. 6 is one of the perspective exploded views of the cup body as shown in FIG. 4.
Figure 7:
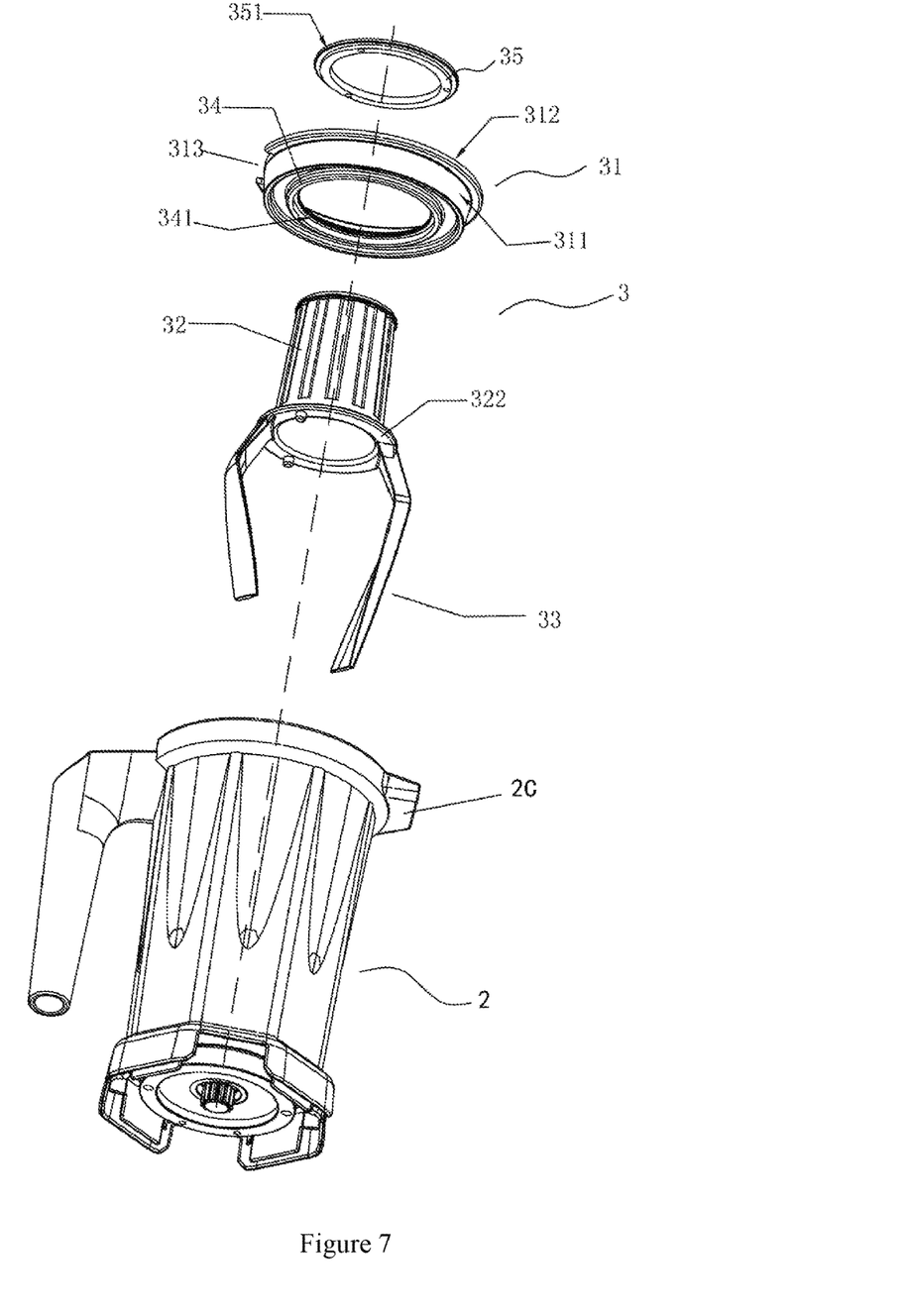
FIG. 7 is another of the perspective exploded views of the cup body as shown in FIG. 4.
Figure 8:
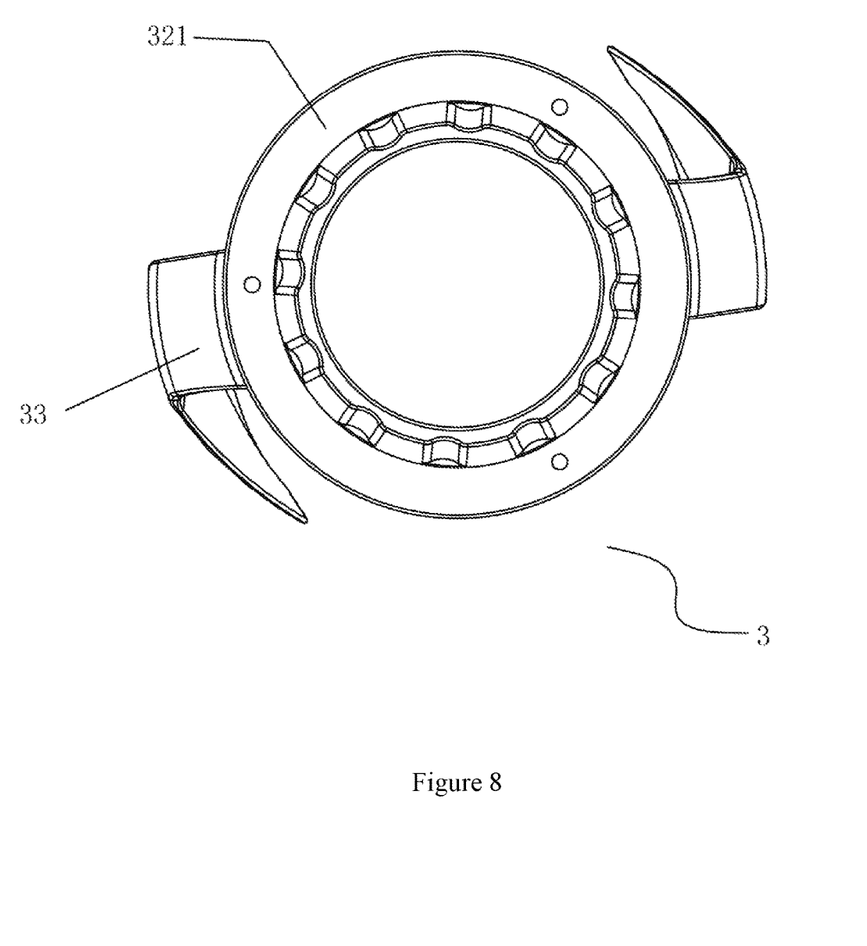
FIG. 8 is a bottom view of the upper auxiliary cutting apparatus as shown in FIG. 4.

Referring to FIGS. 4 to 8, FIG. 4 is a perspective view of the cup body of the mixer as shown in FIG. 3, FIG. 5 is a perspective sectional view of the cup body as shown in FIG. 4, FIG. 6 is one of the perspective exploded views of cup body as shown in FIG. 4, FIG. 7 is another of the perspective exploded views of cup body as shown in FIG. 4, and FIG. 8 is a bottom view of the upper auxiliary cutting apparatus as shown in FIG. 4.

Referring to FIG. 5, a step 2A is provided on the inner wall at the upper opening of the cup body 2.

The mixer also includes an upper auxiliary cutting apparatus 3 disposed on the step 2A and rotating relative to the cup body 2.

Referring to FIGS. 6 and 7, the upper auxiliary cutting apparatus 3 includes a base substrate 31 with a central hole, a driving apparatus 32 and an upper mixing blade 33 disposed thereon. The upper mixing blade 33 has a cutting side along one side of the circumference and a backside along another side of the circumference; or the upper mixing blade 33 has two cutting sides along both sides of the circumference. The upper mixing blade 33 is in helix shape.

The base substrate 31 is disposed on step 2A and removably connected to the cup body 2. The driving apparatus 32 is pin-jointed to the base substrate 31.

The driving apparatus 32 includes a base plate 321, a driving handle 322 and an axle 323 disposed therebetween. The upper mixing blade 33 is fixably connected to the base plate 321.

An axle sleeve 34 is disposed in the central hole of the base substrate 31 and a circle guide plate 341 is disposed in the axle sleeve 34.

The upper auxiliary cutting apparatus 3 also includes a sleeve 35, on the top of which a circle pressure plate 351 is disposed.

The driving handle 322 passes through the axle sleeve 34 and goes out of the axle sleeve 34. The base plate 321 is able to slide fit with the circle guide plate 341 in the axle sleeve 34. The sleeve 35 is inserted into the central hole of the circle guide plate 341. The bottom end of the axle sleeve 34 is attached to the base plate 321. The circle pressure plate 351 is embedded into axle sleeve 34 and is able to slide fit with the circle guide plate 341. The sleeve 35 is fixably connected to the base plate 321. The driving handle 322, sleeve 35 and the base plate 321 rotate relative to the axle sleeve 34.

A connection sleeve 311 is radially provided on the edge of base substrate 31. The outwardly folding margin 312 is disposed on the top of the connection sleeve 311 and a slot 313 is disposed on the edge of the outwardly folding margin 312.

A tongue 2B is disposed on the step 2A on the cup body 2. The connection sleeve 311 is inserted into the portion below the step 2A within the cup body 2, the outwardly folding margin 312 is attached to the step 2A and the tongue 2B is embedded into the slot 313, thereby avoiding the rotation of the base substrate 31.

The curvature of the connection sleeve 311 is the same as the one of cup body 2 on lower step 2A, so that when the connection sleeve 311 is inserted into the lower step 2A of the cup body 2, they will fit each other.

A liquid guide nozzle 2C is disposed on the upper opening on the cup body 2, which is located on the upper opening of the cup body 2 which is located at upper portion of the step 2A.

When the cutting blade disposed on the bottom of the cup body is working, it cuts the materials and makes the materials to be upside-down to mix completely, meanwhile, on one hand, the upper auxiliary cutting apparatus disposed on the upper cup body rotates automatically with the rotation of the materials to exert hindrance on the materials; on the other hand, the upper auxiliary cutting apparatus can be driven manually and the upper auxiliary cutting apparatus can rotate in the same direction as cutting blade, or can be in reverse direction to the cutting blade; so as to mix the materials and expedite the process. Moreover, when the driving handle is rotated, the sleeve and the base plate rotate relative to the axle sleeve, and they drive the rotation of the upper mixing blade, but the base substrate is fixed, so that the safety when using upper auxiliary cutting apparatus is improved.

Figure 9:
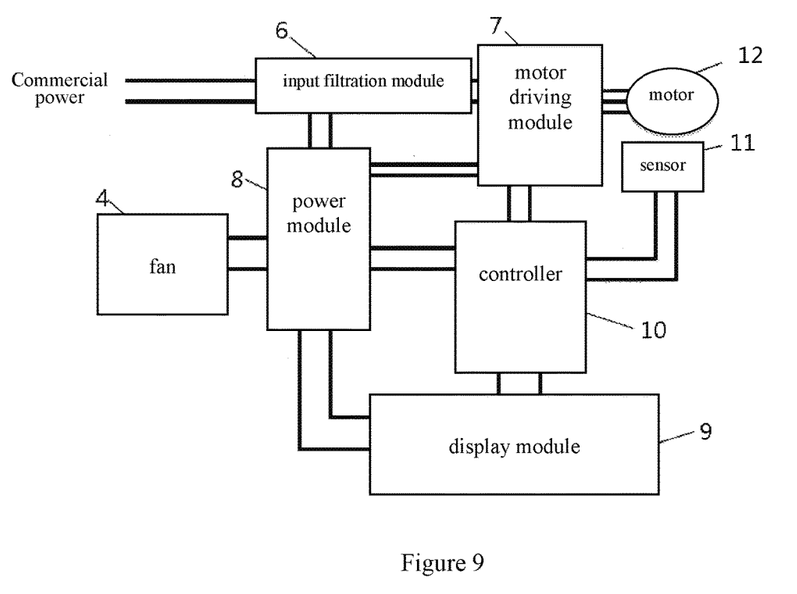
FIG. 9 is an electrical schematic diagram of a mixer provided by the working example of the present invention.

As shown in FIG. 9, an electrical schematic diagram of a mixer provided by the working example of the present invention is provided.

The mixer also includes an input filtration module 6, a motor driving module 7, a power module 8 and a display module 9; wherein:

the commercial power input port of the input filtration module 6 is used to electrically connect to the commercial power, the output port of the input filtration module 6 is electrically connected to the power module 8; and the input filtration module 6 is used to filter and rectify the voltage of the commercial power and various DC voltages can be obtained by the power module 8;

the power module 8 is electrically connected to power ports of the fan 4, the motor driving module 7, the display module 9 and the controller 10; wherein the fan 4 is a DC fan;

the fan controlling port of the controller 10 is electrically connected to the power module and the controller 10 controls ON/OFF of the power port of the fan 4 by controlling the power module 8;

the motor controlling port of the controller 10 is electrically connected to the motor 12 through the motor driving module and controls the rotation speed of the motor 12 by the motor driving module 7;

the display signal output port of the controller 10 is electrically connected to the display module 9, wherein the display module 9 is used to the display the residual mixing time period.

More preferably, the mixer also includes a sensor 11 for detecting the motor rotation speed of the motor 12; and the sensor 11 is electrically connected to the controller 10.

The present invention achieves the following advantages:

1. The operation of the fan is stopped later than the motor, so as to release the residual heat out of the motor, thereby avoiding the damage of the internal coils within the motor due to the residual heat and enhancing the service life of the motor.

2. The vibration and the noise caused by the synchronous rotation of the motor and the fan and the issues causing that the fan is worn down in an expedited way and that the service life of the fan is influenced are avoided. The fan of the present invention produces low level of the noise ranging from 65 db to 85 db when it is working, as compared to the noise up to 85 db to 100 db produced by the controlling structure of the conventional synchronous operation of the fan and the motor, the fan of the present invention has the features of reduced working noise and improved service life.

The ordinary skilled in the art should understand that all of the procedures or part of procedures of the above working examples can be achieved by the associated hardware instructed by the computer programs. The programs can be stored in a computer readable storage media and when performing, such programs may include the procedures of the working examples of each method as mentioned above. The storage media may be magnetic disk, optical disk, read-only memory (ROM) or random access memory (RAM) and the like.

The foregoing is the preferable embodiments of the present invention. It should be understood that, a variety of modifications and changes can be made by the ordinary skilled in the art without departing from the spirit of the present invention and these modifications and changes come within the scope of the present invention.

What is claimed is:

1. A method for controlling a mixer that includes a housing, a cup body disposed on the housing, a motor and a fan disposed within the housing and a mixing part disposed within the cup body and co-axially connected to the motor, wherein the fan and the motor are opposite to each other, wherein the method individually controls the motor and the fan by two-way individual output controlling means respectively, including: when obtaining an instruction for initiating the mix from a user, sending a fan initiation control signal to the fan first, to allow the fan to operate at a pre-set fan rotation speed; then, after a pre-set second delayed time period, sending a motor initiation control signal to the motor to allow the motor to operate at a pre-set motor rotation speed within a pre-set mixing time period, such that the fan is initiated prior to the motor when an instruction for initiating the mix from a user is obtained; wherein the instruction for initiating the mix includes a mixing time period; when the mixing time period is ended, sending a motor stop control signal to the motor first, to stop the operation of the motor; and then, after a pre-set first delayed time period, sending a fan stop control signal to the fan to stop the operation of the fan, such that the operation of the fan is stopped later than the motor.

2. The method of claim 1, wherein the said allowing the motor to operate at the pre-set motor rotation speed within the pre-set mixing time period specifically comprises: allowing the motor to uniformly operate at a first motor rotation speed within the set mixing time period, wherein the instruction for initiating the mix includes the first motor rotation speed.

3. The method of claim 2, wherein, the method for controlling a mixer further includes: sending a rotation speed switching control signal to the motor when obtaining an instruction for switching the rotation speed from the user within the mixing time period, to allow the motor to uniformly operate at a second motor rotation speed; wherein the instruction for switching the rotation speed includes the second motor rotation speed.

4. The method of claim 1, wherein the mixing time period includes N consecutive time periods, each of which has a pre-set motor rotation speed and wherein the motor rotation speed pre-set in at least one time period is different from the motor rotation speed set within other time periods.

5. The method of claim 4, wherein the instruction for initiating the mix includes selection of one mixing work modes from M kinds of pre-set mixing work modes by the user; and wherein each kind of mixing work mode is individually provided with a motor rotation speed of each time period from N consecutive time periods.

6. The method of claim 1, wherein the method for controlling a mixer further includes: extending the mixing time period to the originally set mixing time period when obtaining an instruction for extending the mix from the user within the mixing time period, to update the mixing time period; wherein the instruction for extending the mix includes the time period which needs to be extended; and obtaining a current motor rotation speed when the mixing time period is ended and sending a rotation speed maintenance signal to the motor, to allow the motor to uniformly operate at the current motor rotation speed within said mixing time period which needs to be extended.

\* \* \* \* \*